US006259310B1

(12) United States Patent
Kawamura

(10) Patent No.: US 6,259,310 B1
(45) Date of Patent: Jul. 10, 2001

(54) APPARATUS AND METHOD FOR A VARIABLE NEGATIVE SUBSTRATE BIAS GENERATOR

(75) Inventor: J. Patrick Kawamura, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/449,409

(22) Filed: May 23, 1995

(51) Int. Cl.[7] ........................................... G05F 3/02
(52) U.S. Cl. ............................. 327/536; 327/537
(58) Field of Search .................... 327/535, 536, 327/537

(56) References Cited

U.S. PATENT DOCUMENTS

| Re. 34,797 | * | 11/1994 | Sato et al. ........................ 327/534 |
| 4,961,007 | * | 10/1990 | Kumanoya et al. ............... 327/537 |
| 5,034,625 | * | 7/1991 | Min et al. ......................... 327/537 |
| 5,362,990 | * | 11/1994 | Alvarez et al. ................... 327/536 |
| 5,392,253 | * | 2/1995 | Atsumi et al. .................... 327/534 |
| 5,396,128 | * | 3/1995 | Dunning et al. .................. 327/534 |
| 5,434,820 | * | 7/1995 | Kim .................................. 327/536 |

FOREIGN PATENT DOCUMENTS

WO 80/01021 * 5/1980 (JP) ..................................... 327/534

* cited by examiner

Primary Examiner—Terry D. Cunningham
(74) Attorney, Agent, or Firm—Alan K. Stewart; Wade James Brady, III; Frederick J. Telecky, Jr.

(57) ABSTRACT

A VBB voltage generator unit for biasing of the semiconductor chip substrate is comprised of five basic elements, a standard p-channel substrate pump unit a pump supply voltage switch, a VBB level control logic unit, a high and low frequency oscillators unit, and a Vperi voltage divider unit for generating a fractional Vperi voltage. The substrate pump is a standard two-phase p-channel coupling pump. In response to appropriate control signals, p-channel coupling pump can provide a plurality of VBB voltage levels in response to a single oscillator frequency. The VBB voltage levels can be correlated, via the control signals, to the operational mode of the device.

13 Claims, 3 Drawing Sheets

APPARATUS AND METHOD FOR A VARIABLE NEGATIVE SUBSTRATE BIAS GENERATOR

BACKGROUND OF THE INVENTION

1. Field of the Invention

This invention relates generally to apparatus associated with an integrated circuit memory array and, more particularly, to the voltage generators which are used to provide the bias voltage for the substrate in memory arrays.

2. Description of the Related Art

The complementary metal oxide semiconductor (CMOS) devices are constrained by the requirement for high speed operation and by the requirement for low power consumption. These requirements can be achieved, inter alia, by employing new device architecture, reducing the supply voltage, reducing the device size, and utilizing on-chip power management circuit(s). One of the most crucial factors in the further development of memory and logic circuit devices is the availability of transistors that can deliver a high drive current while maintaining low threshold voltage, Vth, and low sub-threshold leakage current. (In addition, the transistors must maintain the drain terminal to source terminal breakdown voltage, minimize "hot" electron carrier injection, exhibit low drain terminal and source terminal capacitance, and exhibit low junction leakage current, etc.) Because the transistor performance parameters are interrelated, the transistors which are finally implemented in a semiconductor device are a compromise of the desired parameters. Certain transistor applications, however, require that the drive current, the threshold voltage, Vth, and the leakage current parameters meet stringent characteristics. In particular, the dynamic random access memory (DRAM) n-channel passgate transistor in the semiconductor memory array must have a low threshold voltage and good drive current for high-speed-charge transfer between the memory cell and the bitline. In addition, the passgate transistor must maintain an extremely low leakage current (to retain the logic state determined by the charge on the capacitor). In order to achieve a high performance passgate transistor, two circuit techniques have been developed to improve the transistor performance:

1) A booted wordline voltage level, VPP, is generated by apparatus on the device substrate to increase the drive strength as well as the speed of the n-channel passgate transistor. A relatively high gate-to-source voltage, Vgs, from the VPP voltage level increases the channel conductance and the fast gate-to-source voltage rise time compensates for the relatively high threshold voltage, Vth, of the passgate transistor. A threshold voltage drop is also eliminated with the VPP voltage level to write a full logic "1" into the storage cell.

2) To reduce the transistor leakage current in the sub-threshold regime and the source-drain capacitance, a negative substrate back bias voltage generator, VBB, is implemented on the DRAM memory array substrate. The VBB voltage generator or pump takes the p-tank substrate region to a fixed negative level (the level being determined by the pump frequency, amplitude, and the Vth of the transistor pumping circuit) to increase the body effect and thus increase the effective Vth of the passgate device. This negative level can also cause the increase in the p-n junction leakage current of the passgate. A VBB generator must provide for both high current drive of the passgate transistor and low leakage current during the standby mode of the DRAM memory unit.

Referring to FIG. 1, a block diagram of the a VBB voltage generator according to the related art is shown. The ENABLE/CONTROL signals are applied to the high and low frequency oscillators unit 11. The oscillators unit 11 applies a periodic signal (with a frequency determined by the control signals) to the VBB pump unit 12. VBB pump unit 12 has an output terminal coupled to the substrate well unit and applies a bias voltage thereto. The VBB pump unit 12 typically operates by storing a charge on a pump capacitor, one plate of the capacitor being at a first voltage level; changing the voltage level on the capacitor plate to a second voltage level; removing the charge from the capacitor; returning the capacitor plate voltage to the first voltage level; and repeating the procedure. In this manner, the VBB pump unit can provide a voltage level on a semiconductor chip which is outside of the range of the applied voltages, i.e., in the present invention, VBB is less than the lower supply voltage VSS. The voltage levels are typically changed in response to an oscillator signal. Because the VBB is a function of the amount of charge transferred, a limited control of the VBB voltage can be provided by changing the frequency of the oscillator signal, the oscillator signal frequency being a function of ENABLE/CONTROL signals. In FIG. 1, the VPERI is approximately equal to VDD (>VSS). The VBB pump unit 12 provides a substrate bias voltage VBB which is less than VSS.

The VBB pump unit of the related art has had limited capability to respond to the operating modes of the circuit. A need has therefore been felt for a VBB generator which can compensate for leakage current during fast passgate transistor operation in the normal operational mode, for the standby operational mode, or for the self-refresh operational mode.

SUMMARY OF THE INVENTION

The aforementioned and other features are provided according to the present invention, by a variable VBB voltage generator whereby the VBB level is controlled by apparatus located on the semiconductor. Signals indicative of the operation are applied to a voltage level control unit. The voltage level control unit applies control signals to the voltage pump unit. The voltage pump unit applies a bias voltage to the substrate which compensates of the leakage current in the several operational modes for a single oscillator frequency.

These and other features of the present invention will be understood upon reading of the specification along with the drawings.

DESCRIPTION OF THE PREFERRED EMBODIMENT(S)

1. Detailed Description of the Drawings

Figure 1:
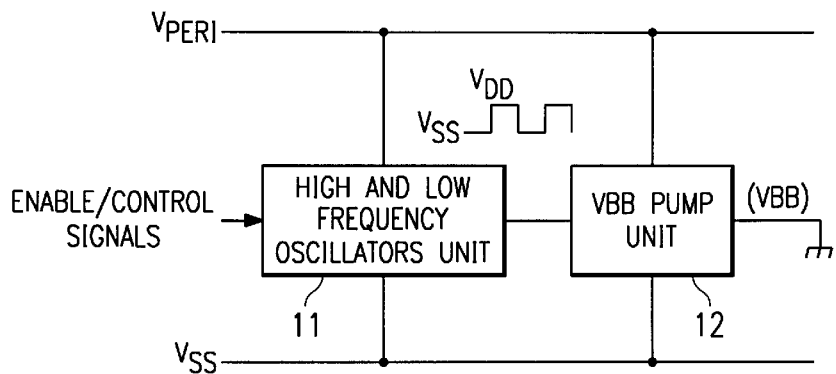
FIG. 1 is a block diagram of a VBB voltage generator according to the prior art.

FIG. 1 has been described with relationship to the related art.

Figure 2:
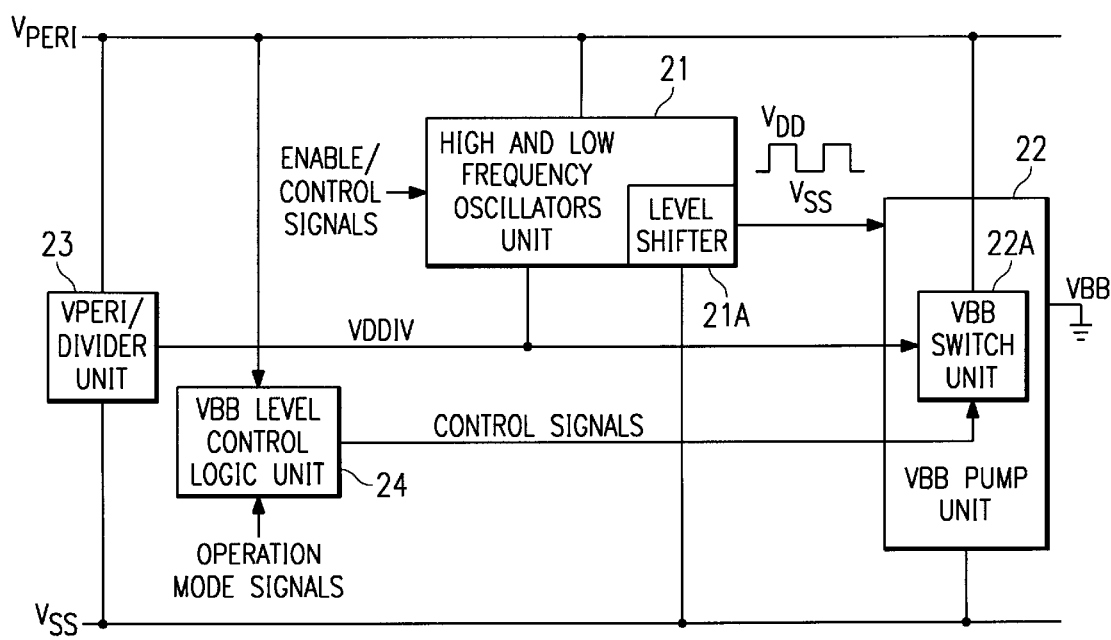
FIG. 2 is a block diagram of the VBB voltage generator according to the present invention.

Referring next to FIG. 2, the block diagram of the VBB voltage generator, according to the present invention, is shown. Enable\control signals are applied to the high and low frequency oscillators unit 21. Operation mode signals are applied to the VBB level control logic unit 24. The VPERI divider unit 23 has the VPERI voltage applied thereto and generates a voltage which is a fraction of the voltage level applied to the VPERI terminal. The high and low frequency oscillator unit 21 includes a level shifter unit 21A. The output signal from the level shifter 21A is applied to the VBB pump unit 22. The output signals from the VPERI divider unit 23 and the VBB level control logic unit 24 are applied to the VBB switch unit 22A which is a part of the VBB pump unit 22. The output signal of the VBB pump unit 22 is applied to the substrate well and determines the voltage of the substrate well.

Figure 3:
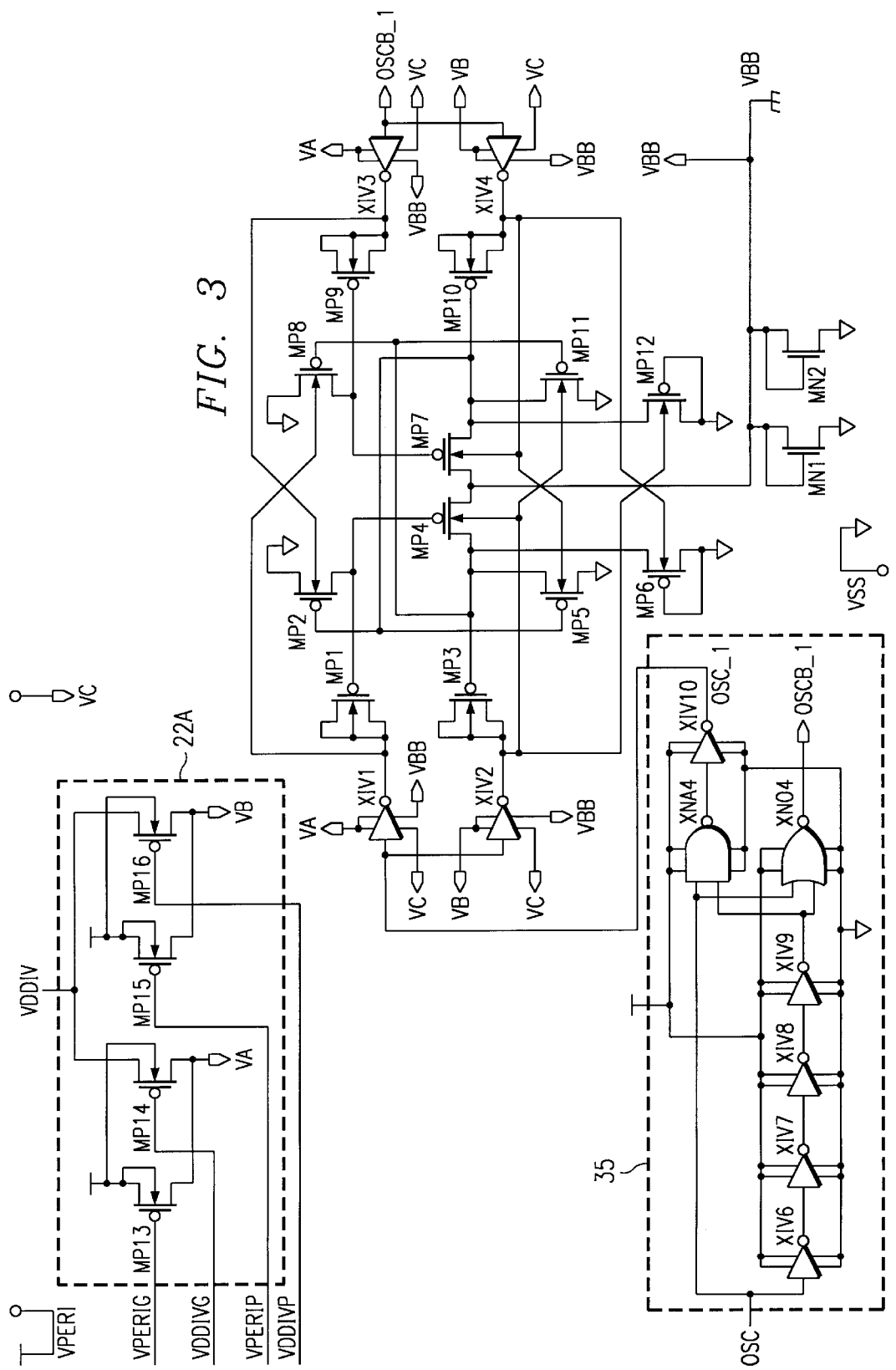
FIG. 3 is a schematic circuit diagram of VBB pump unit shown in FIG. 2.

Referring to FIG. 3, the supply voltage VPERI is applied to the source terminal and substrate of p-channel transistors M13, MP15; to the substrate of p-channel transistors MP14 and MP16; and to the power terminals of inverting amplifiers XIV6, XIV7, XIV8, XIV9 and XIV10; to the power terminals of NOR logic gate XNO4; and to the power terminals of NAND logic gate XNA4. The VDDIV terminal is coupled to the source terminal of transistor MP14 and to the source terminal of MP16.

The VPERIG signal is coupled to the gate terminal of transistor MP13, the VDDIVIG signal is coupled to the gate terminal of transistor MP14, the VPERIP signal is coupled to the gate terminal of transistor MP15, and the VDDIVP signal is coupled to a gate terminal of transistor MP16.

A VA terminal is coupled to a drain terminal of transistor MP13, to a drain terminal of transistor MP 14, to power terminals of inverting amplifier XIV1, and to power terminals of inverting amplifier XIV3. A VB terminal is coupled to drain terminals of transistors MP15 and MP16, and to power terminal of inverting amplifiers XIV2 and XIV4. A VC terminal is coupled to a first ground terminal of inverting amplifiers XIV1, XIV2, XIV3 and XIV4.

The VSS power supply terminal is coupled to the ground terminals of inverting amplifiers XIV6, XIV7, XIV8, XIV9, XIV10, logic NAND gate XNA4, and logic NOR gate XNO4; to the source terminals of n-channel transistors MN1 and MN2; to the drain terminals of p-channel transistors MP5, MP11, MP2 and MP8; and to the gate and drain terminals of p-channel transistors MP6 and MP12.

The VBB output voltage terminal is coupled to the gate and source terminals of transistors MN1 and MN2; to first conduction terminals of p-channel transistors MP4 and MP7; and to second ground terminals of inverting amplifiers XIV1, XIV2, XIV3, and XIV4.

An oscillator signal is applied to an input terminal of inverting amplifier XIV6 and to a second input terminal of logic NAND gate XNA4 and a second input terminal of logic NOR gate XNO4. The output terminal of inverting amplifier XIV6 is coupled to an input terminal of inverting amplifier XIV7. The output terminal of inverting amplifier XIV7 is coupled to an input terminal of inverting amplifier XIV8. An output terminal of inverting amplifier XIV8 is coupled to an input terminal of inverting amplifier XIV9. An output terminal of inverting amplifier XIV9 is coupled to a first input terminal of logic NOR gate XNO4 and to a first terminal of logic NAND gate XNA4. An output terminal of logic NOR gate XNO4 is coupled to an input terminal of inverting amplifier XIV3 and an input terminal of inverting amplifier XIV4. The output signal of logic NOR gate XN04 provides an oscillating signal with a first phase.

An output terminal of logic NAND gate XNA4 is coupled through inverting amplifier XIV10 to and input terminal of inverting amplifier XIV1 and an input terminal of inverting amplifier XIV2. The output signal of inverting amplifier XIV10 provides an oscillating signal having a second phases. An output terminal of inverting amplifier XIV1 is coupled to the conduction terminals and the substrate of p-channel transistor MP1 and to the substrate of p-channel transistor MP8. The output terminal of inverting amplifier XIV3 is coupled to the conduction terminals and the substrate of p-channel transistor MP9 and to the substrate of transistor MP2.

A gate terminal of transistor MP1 is coupled to a drain terminal of transistor MP2 and to a gate terminal of transistor MP3. A gate terminal of transistor MP9 is coupled to a drain terminal of transistor MP8 and to a gate terminal of transistor MP7.

An output terminal of inverting amplifier XIV2 is coupled to the conduction terminals and the substrate of transistor MP3, to the substrate of transistor MP12, to the substrate of transistor MP 4, and to the substrate of transistor MP11. The output terminal of inverting amplifier XIV4 is coupled to conduction terminal and a substrate of transistor MP10, to the substrate of transistor MP7, to the substrate of transistor MP5, and to the substrate of transistor MP6.

A gate terminal of transistor MP3 is coupled to a second conduction terminal of transistor MP4, to a gate terminal of transistor MP8, to a gate terminal of transistor MP11, to a source terminal of transistor MP5, and to a source terminal of transistor MP6. A gate terminal of transistor MP10 is coupled to a second conduction terminal of transistor MP7, to a gate terminal of transistor MP2, to a gate terminal of transistor MP5, to a source terminal of transistor MP11, and to a source terminal of transistor MP12. The transistors MP3 and MP10 are electrically coupled as capacitors and are used to store the charge which is "pumped" (or voltage shifted) to provide the voltage level of VBB.

Figure 4:
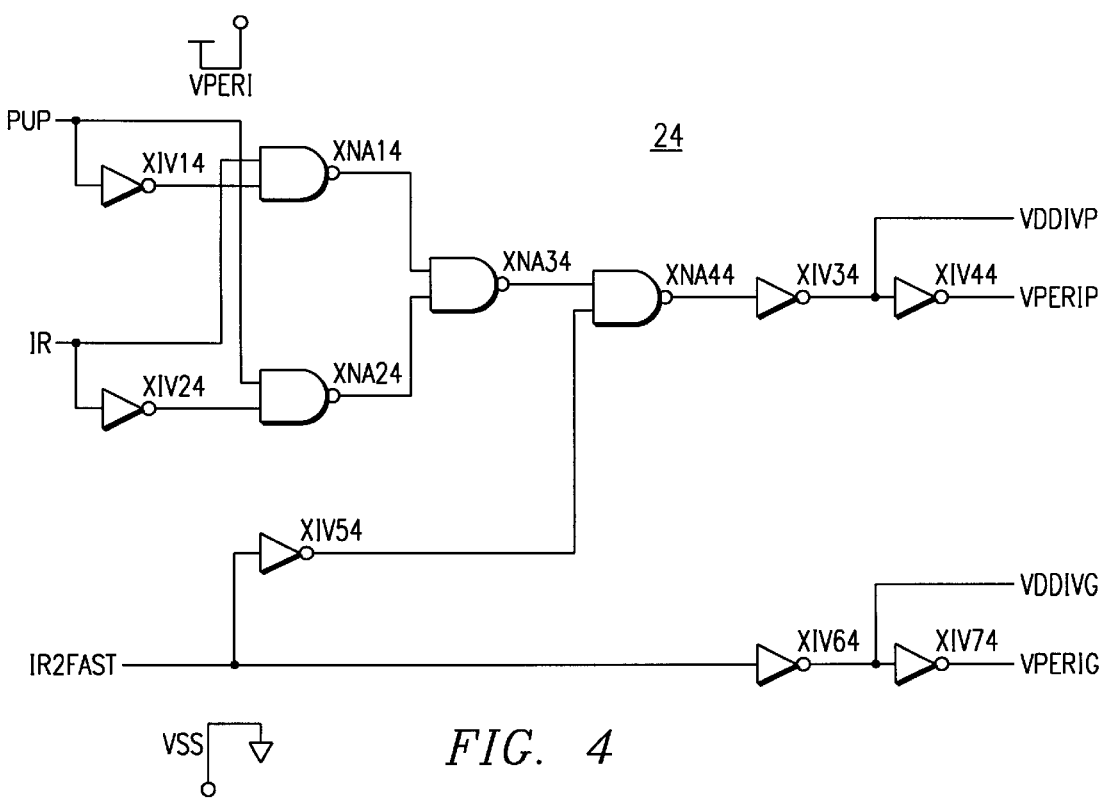
FIG. 4 is a schematic circuit diagram of the VBB level control logic unit shown in FIG. 2.

Referring to FIG. 4, the PUP signal is applied to an input terminal of inverting amplifier XIV14 and to a second input terminal of logic NAND gate XNA24. The IR signal is applied to an input terminal of inverting amplifier XIV24 and to a second input terminal of logic NAND gate XNA14. The IR2FAST signal is applied to an input terminal of inverting amplifier XIV54 and to an input terminal of inverting amplifier XIV64.

The output terminal of inverting amplifier XIV14 is coupled to a first input terminal of logic NAND gate XNA14. The output terminal of inverting amplifier XIV24 is coupled to a first input terminal of logic NAND gate XNA24. The output terminal of inverting amplifier XIV54 is coupled to a first input terminal of logic NAND gate XNA44. The output terminal of inverting amplifier XIV64 is coupled to the VDDIVG terminal and through inverting amplifier XIV74 to the VPERIG signal terminal. The output terminal of logic NAND gate XNA24 is coupled a first input terminal of logic NAND gate XNA34, while the output terminal of logic NAND gate XNA34 is coupled to a second input terminal of logic NAND gate XNA34. The output terminal of logic NAND gate XNA34 is coupled to a second input terminal of logic NAND gate XNA44. An output terminal of logic NAND gate XNA44 is coupled to an input terminal of inverting amplifier XIV34. An output terminal of inverting amplifier is coupled to the VDDIVP terminal and through inverting amplifier XIV74 to the VPERIP terminal. The VPERI terminal is coupled to the power terminal of the components and the ground terminals of the active components are coupled to the VSS voltage supply.

2. Operation of the Preferred Embodiment(s)

Referring once again to FIG. 2, the VBB voltage generator unit of the present invention is comprised of five basic elements, a standard p-channel substrate pump unit, a pump supply voltage switch, a VBB level control logic unit, a high and low frequency oscillators unit, and a VPERI divider unit for generating a voltage level which is a fraction of the VPERI voltage, in the preferred embodiment, the fractional voltage is ½ the Vperi voltage level. The operation of the VBB voltage generator can be understood as follows. The high and low frequency oscillators unit 21 drives the VBB pump unit 22 in the same manner as the high and low frequency oscillator unit 11 drives the VBB pump unit 22 of the prior art. In response to ENABLE/CONTROL signals, the frequency of the high and low frequency oscillators unit 21 signal applied to the VBB pump unit can be altered. The difference in frequency can provide some control of the VBB voltage level. For each frequency from the high and low frequency oscillators unit 21, the voltage level of VBB can assume a plurality of voltage levels. Operation mode signals, identifying the current mode (refresh mode, etc.) of an associated memory unit, are applied to the VBB level control logic unit. In response to the operation mode signals, the VBB level control logic unit generates a plurality of control signals which are applied to the VBB switch unit 22A. The VBB switch unit 22A controls the output voltage of the VBB pump unit 22 by controlling the supply voltage (VA and VB of FIG. 3) of the VBB pump unit.

The substrate pump is a standard two-phase p-channel coupling pump. The unit 35 provides the oscillating signals (OSC_1 and OSCB1) having different phases and enabling the two phase operation, i.e., the precharging and discharging of capacitor MP3 occurring in synchronism with the discharging and precharging of capacitor MP10. The positive-going edge of the oscillator signals (OSC_1 and OSCB1) produce a negative-going edge (i.e., from VDD to VSS) on the source-drain-bulk of the p-channel capacitor (on the output terminals of inverting amplifiers XIV2 and XIV4), which couples the grounded node on the gate side (i.e., of transistors MP3 and MP10) to go below ground by VB volts. At the same time, the p-channel transfer gate (i.e., transistors MP4 and MP7) is similarly coupled down below VSS at −VA volts to electrically connect the substrate (VBB) to the pumping capacitor node (on the output terminals of inverting amplifiers XIV2 and XIV4) at a −VB volts. The pumping operation occurs in two phases, with each successive "pumping" action lowering the VBB voltage level until the VBB level is one Vtp (the threshold voltage or the voltage between the source and the gate of a transistor for conduction to occur) higher than the transfer gate bias voltage or −VA+Vtp. In conventional VBB voltage generators, the VA and the VB are fixed at the VPERI voltage. Thus, a single VBB level of +Vperi+Vtp is possible for one VBB oscillator frequency. The present embodiment has variable VBB voltage supply levels, VA and VB, for three VBB levels at a single oscillator frequency. Control signals VPERIG VPERIP, VDDIVP and VDDIVGP determine the VA and the VB levels of the VBB pump. VA and VB can either be at the VPERI (VDD level of the chip) or a fraction of the VPERI (VDDIV), depending on the gate bias on the transistors MP13 to MP16. As a result, VBB can be as deep as −VPERI+Vtp or as shallow as −(VDDIV)+Vtp. The possible levels are indicated in Table 1.

The operation mode control signals applied to the VBB level control logic unit are PUP (power up signal), IR (internal refresh signal), and IR2FAST (fast operation mode). The VBB level control logic unit recasts these signals into VPERIG, VDDIVG, VPERIP, and VDDIVP signals.

TABLE 1

| Passgate supply (G suffix) | | | | |
| --- | --- | --- | --- | --- |
| | | | MP1 and MP9 | |
| VPERIG | VDDIVG | VA | Gate Voltage | Lowest VBB Level |
| low | high | VPERI | −VPERI | −VPERI + Vtp |
| high | low | Vddiv (VPERI/2) | −Vddiv (−V/2) | −VPERI/2 + Vtp |

| Pump supply (P suffix) | | | |
| --- | --- | --- | --- |
| VPERIP | VDDIVP | VB | MP3 and MP10 Electrode Voltage |
| low | high | VPERI | −VPERI |
| high | low | Vddiv (VPERI/2) | −Vddiv (−VPERI) |

(fraction = ½)

TABLE 2

| Mode of Operation | VBB Control Logic Output | | | | |
| --- | --- | --- | --- | --- | --- |
| | VPERIG | VDDIVG | VPERIP | VDDIVP | VBB |
| Power up | low | high | low | high | −VPERI + Vtpa (deep) |
| Active or Normal | low | high | high | low | −VPERI/2 (medium) |
| Internal Refresh | low | high | low | high | −VPERI + Vtp (deep) |
| Fast Transistor (low array passgate Vth) | high | low | high | low | −VPERI/2 + Vtp (shallow) |

(fraction = ½)

The VBB substrate bias generator was simulated using the SPICE protocols to obtain first order power consumption estimates and verify the functionality of the circuit. The results of this simulation are shown in Table 3. As can be seen from this table, the simulation verified that the present design gave three VBB levels for a single (50 kHz) oscillator.

Figure 5:
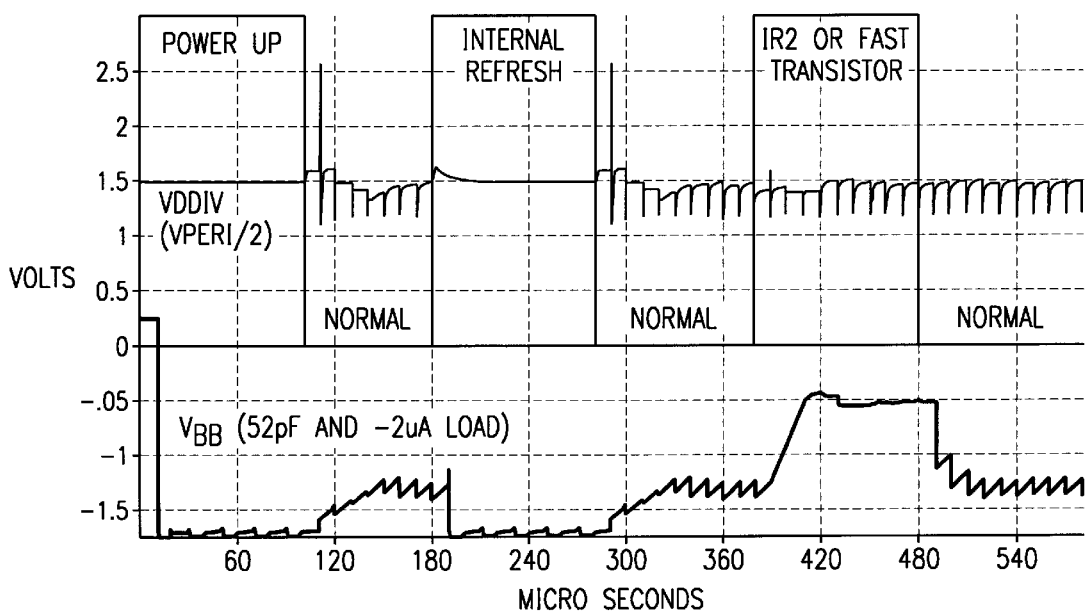
FIG. 5 is a diagram showing the results of simulating the operation of VBB voltage according to the present invention.

Referring to FIG. 5, the results of a simulation are shown in which the mode of operation of the VBB voltage generator was changed five times in order to estimate the change in the VBB voltages. The simulation assumed a 50 pF capacitance load and the addition of a 2 uA current source to introduce a leakage path between the VBB level and the ground terminal.

TABLE 3

| Mode of Operation | VBB Control Logic Output | | | | | Total Current Consumption |
|---|---|---|---|---|---|---|
| | VPERIG | VDDIVG | VPERIP | VDDIVP | VBB | |
| Power up | 0 v | 3 v | 0 v | 3 v | −2.006 v | 4.82 uA |
| Active or Normal | 0 v | 3 v | 3 v | 0 v | −1.487 v | 4.16 uA |
| Internal refresh | 0 v | 3 v | 0 v | 3 v | −2.006 v | 4.82 uA |
| Fast transistor (low array passgate Vth) | 3 v | 0 v | 3 v | 0 v | −0.806 v | 0.57 uA |

(fraction = ½)

While the invention has been described with particular reference to the preferred embodiment, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, and it is therefore contemplated that other modifications and applications will occur to those skilled in the art. It is accordingly intended that the claims shall cover all modifications and applications as do not depart from the spirit and scope of the invention.

What is claimed is:

1. A VBB voltage generator unit for biasing of the semiconductor chip substrate, said generator unit comprising:
   a oscillator unit responsive to first control signals for providing an oscillating signal having a predetermined frequency;
   a VBB level control logic unit responsive to operation mode signals for providing second control signals;
   a fractional supply voltage generator unit for generating a voltage level which is a fraction of said supply voltage; and
   a pump unit having said voltage level applied thereto and responsive to said oscillating signal and said second control signals for providing a plurality of semiconductor substrate bias levels.

2. The generator unit of claim 1 wherein said pump unit includes a pump switch unit.

3. The generator unit of claim 2 wherein said pump unit provides three substrate bias levels for each oscillating signal frequency.

4. The generator unit of claim 3 wherein said three substrate bias levels are provided in response to operation mode signals for an active, a power up, and a fast transistor (low array passgate Vth) mode of operation.

5. The generator unit of claim 2 wherein said switch unit provides two bias voltages for said pump unit in response to said second control signals.

6. The generator unit of claim 5 wherein said substrate pump is a two-phase, p-channel charge pump.

7. The generator unit of claim 6 wherein said two-phase, p-channel charge pump includes a passgate, said substrate bias voltages being determined by said switch unit bias voltage levels and a threshold voltage of said passgate.

8. The generator unit of claim 7 wherein said generator unit provides a bias voltage for a substrate of a DRAM memory unit.

9. The method for providing a plurality of substrate bias voltage levels, said method comprising the steps of:
   applying an oscillating signal having predetermined frequency to a substrate charge pump;
   applying a voltage level which is a fraction of a supply voltage level to a substrate switch unit;
   applying control signals to said switch unit, said pump switch unit applying a plurality of voltage levels to said substrate pump; and
   generating a plurality of substrate bias voltage levels by said substrate pump in response to said oscillating signal and said plurality of voltage levels, said voltage levels being a supply voltage level and said fraction of a supply voltage level.

10. The method of claim 9 further including the step of providing said control signals by a control level logic unit in response to operational mode signals.

11. The method of claim 10 wherein said generating step includes the step of generating at least three bias voltage levels.

12. The method of claim 11 wherein the step of generating three bias voltage levels includes the step of determining said three bias voltage levels by said plurality of bias voltage levels and a p-channel pump passgate threshold voltage.

13. An DRAM memory unit comprising:
   a memory cell array and associated circuits; and
   a pump circuit for providing a plurality of substrate bias voltages, said pump circuit including:
   a pump switch for supplying a plurality of voltages, wherein levels of said voltages are determined in response to control signals, said control signals determined by an operational state of said memory cell array; and
   a pump unit including a transfer component, each voltage providing a supply voltage for said pump unit, said pump unit responsive to levels of said plurality of voltages and to an oscillating signal having a determined frequency for providing said plurality of substrate bias voltages.

* * * * *